(12) United States Patent
Lee

(10) Patent No.: US 7,310,805 B2
(45) Date of Patent: Dec. 18, 2007

(54) EMERGENCY EJECTION DEVICE

(75) Inventor: Cheng-Fu Lee, Taipei (TW)

(73) Assignee: Lite-On It Corporation (TW)

( * ) Notice: Subject to any disclaimer, the term of this patent is extended or adjusted under 35 U.S.C. 154(b) by 474 days.

(21) Appl. No.: 11/046,840

(22) Filed: Feb. 1, 2005

(65) Prior Publication Data
US 2005/0188392 A1    Aug. 25, 2005

(30) Foreign Application Priority Data
Feb. 24, 2004 (TW) .............................. 93202658 U

(51) Int. Cl.
*G11B 17/04* (2006.01)
(52) U.S. Cl. ................................... 720/636
(58) Field of Classification Search ...................... None
See application file for complete search history.

(56) References Cited

U.S. PATENT DOCUMENTS 5,561,653 A * 10/1996 Liou et al. .................. 720/609

6,320,835 B1 * 11/2001 Kamei ........................ 720/653

FOREIGN PATENT DOCUMENTS

| JP | 07254264 A | * 10/1995 |
| JP | 2000306307 A | * 11/2000 |

* cited by examiner

*Primary Examiner*—David Davis
(74) *Attorney, Agent, or Firm*—Bacon & Thomas, PLLC

(57) ABSTRACT

An emergent disc-ejection device applied in a disc player having a bottom casing and a disc accessing body is provided. The bottom casing has a via hole, while the disc accessing body is disposed on the bottom casing. The emergent disc-ejection device includes a tray, an active element and a connecting rod. The tray carries a disc to enter and leave the disc accessing body. The active element is coupled to the tray for carrying the tray to be ejected from the disc accessing body. The connecting rod and the disc accessing body are connected via a pin joint. By inserting a probe into the via hole along a first direction to provide an applying force to the force receiving portion, the force applying portion will push the active element along a second direction, enabling the active element to carry the tray to be ejected from the disc accessing body.

10 Claims, 7 Drawing Sheets

EMERGENCY EJECTION DEVICE

This application claims the benefit of Taiwan application Serial No. 93202658, filed Feb. 24, 2004, the subject matter of which is incorporated herein by reference.

BACKGROUND OF THE INVENTION

1. Field of the Invention

The invention relates in general to a disc-ejection device, and more particularly to an emergent (i.e., emergency) disc-ejection device applied in a disc player.

2. Description of the Related Art

Living in the age of information explosion, most multimedia products are issued in the form of optical discs. Accompanied by the popularity of audio/visual discs, the demand for disc player increases significantly. The disc player really plays an important role in multi-media products.

Referring to FIG. 1A, a schematic diagram of a disc player with a conventional emergent disc-ejection device is shown. For the purpose of illustration in FIG. 1A, both the bottom casing 105 and the probe 120 are illustrated in dotted lines, while the disc accessing body 110 disposed in the bottom casing 105 is illustrated in solid lines. A conventional emergent disc-ejection device is applied in a disc player having a bottom casing 105 and a disc accessing body 110.

Considering the appearance of the front panel, ordinary disc players, a digital versatile disc (DVD) player for instance, normally has a via hole, which accommodates the probe and activates the emergent disc-ejection device, disposed on the bottom casing of the disc player. As shown in the diagram, the disc player has a strip via hole 115 disposed on the bottom casing 105. The disposition of the via hole 115 facilitates the probe 120 to be inserted into the bottom casing 105 through the via hole 115.

On the other hand, the disc accessing body 110 of a disc player is used for accessing a disc and is disposed on the inner surface of the bottom casing 105. A conventional emergent disc-ejection device includes a tray 125 and an active element 130. The tray 125, which is disposed on the disc accessing body 110, is for carrying the disc to enter and leave the disc accessing body 110. The active element 130 and the tray 125 are coupled together, wherein the active element 130 is for carrying the tray 125 so that the tray 125 can be ejected from the disc accessing body 110, while the active element 130 has an abutting portion 135 disposed thereon.

Generally speaking, when the power source of the disc player is switched on, if the user presses the disc-ejection button disposed on the front panel, which is disposed on one side of the bottom casing 105 and opposite to the tray 125 of the disc accessing body 110, the tray 125 will be ejected from the disc accessing body 110 until the tray 125 reaches the outer edge of the front panel disc player. After the tray 125 has been ejected to a fixed position, the disc can be placed into or removed from the tray 125.

When the above method fails to eject the tray 125 from the disc accessing body 110, or the user would like to eject the tray 125 from the disc player when the power source is switched off, the user can, first of all, insert the probe 120 into the via hole 115 along the first direction X1 as shown in FIG. 1A, so that the probe 120 abuts the abutting portion 135 disposed on the active element 130 of the disc accessing body 110.

Refer to FIG. 1B and FIG. 1C together. FIG. 1B is a schematic diagram of applying force for a probe to push active element along a second direction, while FIG. 1C is a front view of FIG. 1B. For the purpose of illustration in FIG. 1B, both the bottom casing 105 and the probe 120 are illustrated in dotted lines, while the disc accessing body 110 disposed inside the bottom casing 105 is illustrated in solid lines. Following FIG. 1A to apply a force along a second direction X2 shown the FIG. 1B, through the abutting portion 135, the probe 120 will push the active element 130 to move towards the second direction X2, so as to eject the tray 125 from the disc accessing body 110.

It can be seen in the above disclosure that when using a conventional emergent disc-ejection device of a disc player, the user needs two movements in order to eject the tray 125 from the disc accessing body 110, which is inconvenient in terms of operation and does not comply with consumers' requirements of a simple and easy operation.

SUMMARY OF THE INVENTION

It is therefore an object of the invention to provide an emergent disc-ejection device applied in a disc player. The provided emergent disc-ejection device is convenient in terms of operation and complies with consumers' requirements of a simple and easy operation.

According to the above-identified object, the invention provides an emergent disc-ejection device applied in a disc player having a bottom casing and a disc accessing body, wherein the bottom casing has a via hole, while the disc accessing body is disposed on the bottom casing. The emergent disc-ejection device includes a tray, an active element and a connecting rod. The tray is disposed the disc accessing body for carrying a disc to enter and leave the disc accessing body. The active element and the tray are coupled together, while the active element is for carrying and ejection the tray from the disc accessing body. The connecting rod and the disc accessing body are connected via a pin joint, wherein the connecting rod has a force receiving portion corresponding to the via hole and a force applying portion corresponding to the active element. Of which, by inserting a probe through the via hole disposed on the bottom casing along a first direction, an applying force is provided to the force receiving portion, so that the force applying portion, along a second direction, can push the active element to eject the tray from the disc accessing body.

In the emergent disc-ejection device according to the invention, the tray can have a guiding channel, while the active element can have a protrusion capable of sliding in the guiding channel. When the protrusion can carry the guiding channel to eject the tray from the disc accessing body when moving towards the second direction along with the active element. Moreover, in the emergent disc-ejection device according to the invention, the first direction and the axial direction of the probe are co-directional. Besides, the first direction and the second direction can be substantially perpendicular to each other, while the disc player can be a DVD player.

Other objects, features, and advantages of the invention will become apparent from the following detailed description of the preferred but non-limiting embodiments. The following description is made with reference to the accompanying drawings.

DETAILED DESCRIPTION OF THE INVENTION

The invention is exemplified by a preferred embodiment. However, the scope of protection of the invention is not limited to the preferred embodiment. The preferred embodiment disclosed below is only an emergent disc-ejection device under the spirit of the invention. The technical characteristics of the invention are elaborated below.

Figure 2:
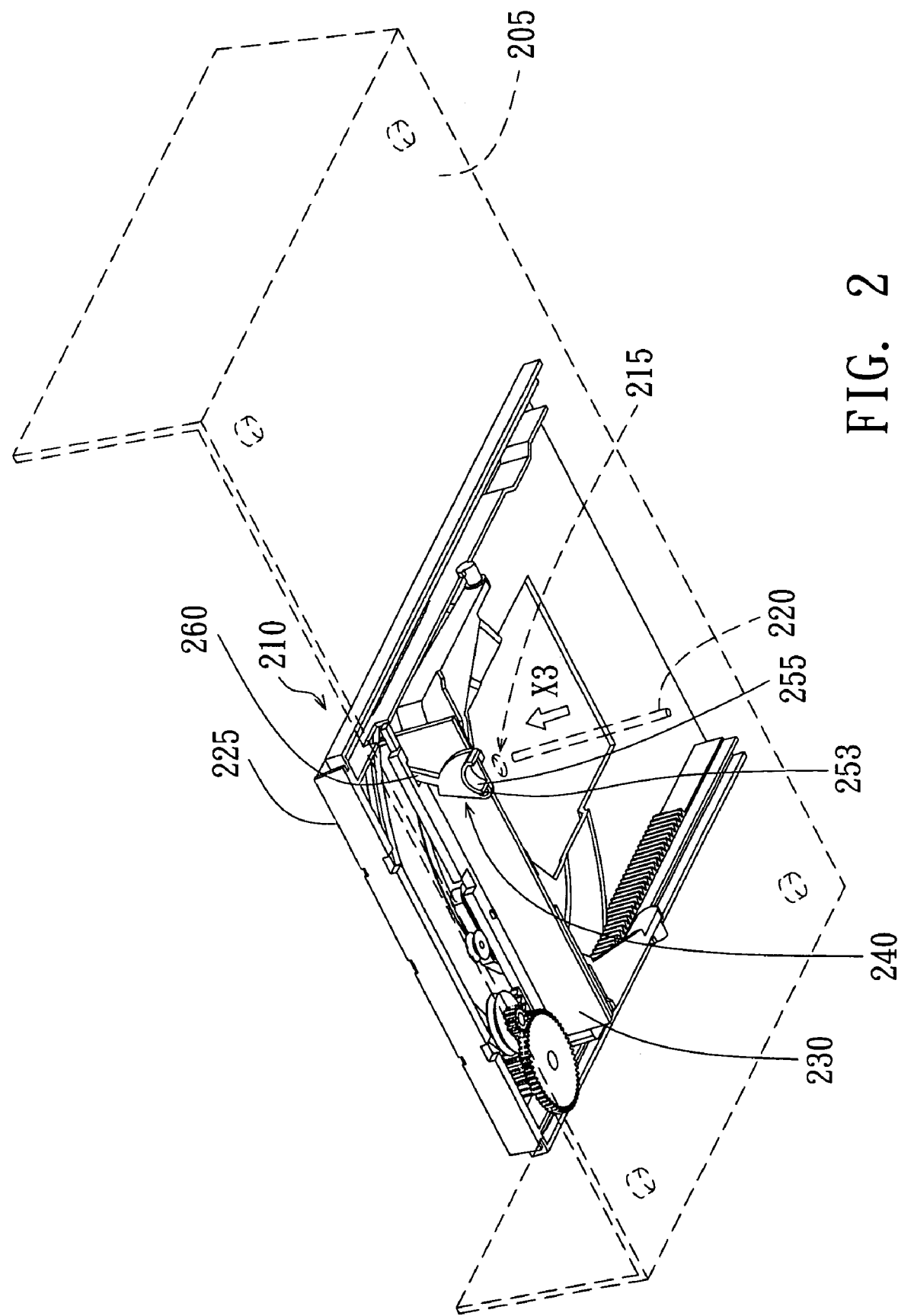
FIG. 2 is a schematic diagram of a disc player with an emergent disc-ejection device according to a preferred embodiment of the invention.

Referring to FIG. 2, a schematic diagram of a disc player with an emergent disc-ejection device according to a preferred embodiment of the invention. For the purpose of illustration in FIG. 2, both the bottom casing 205 and the probe 220 are illustrated in dotted lines, while the disc accessing body 210 disposed inside the bottom casing 205 is illustrated in solid lines. The emergent disc-ejection device according to the invention is applied in a disc player having the bottom casing 205 and the disc accessing body 210, wherein the disc player can be a DVD player.

The bottom casing 205 of a disc player has a via hole 215 running through the bottom casing 205. The disc accessing body 210 is disposed on the inner surface of the bottom casing 205. The emergent disc-ejection device according to the invention includes a tray 225, an active element 230 and a connecting rod 240.

It can be seen from the diagram that the tray 225 is disposed on the disc accessing body 210, while the tray 225 is for carrying disc to enter and leave the disc accessing body 210. The active element 230 and the tray 225 are coupled together, while the active element 230 is for carrying the tray 225 to be ejected from the disc accessing body 210.

Figure 3:
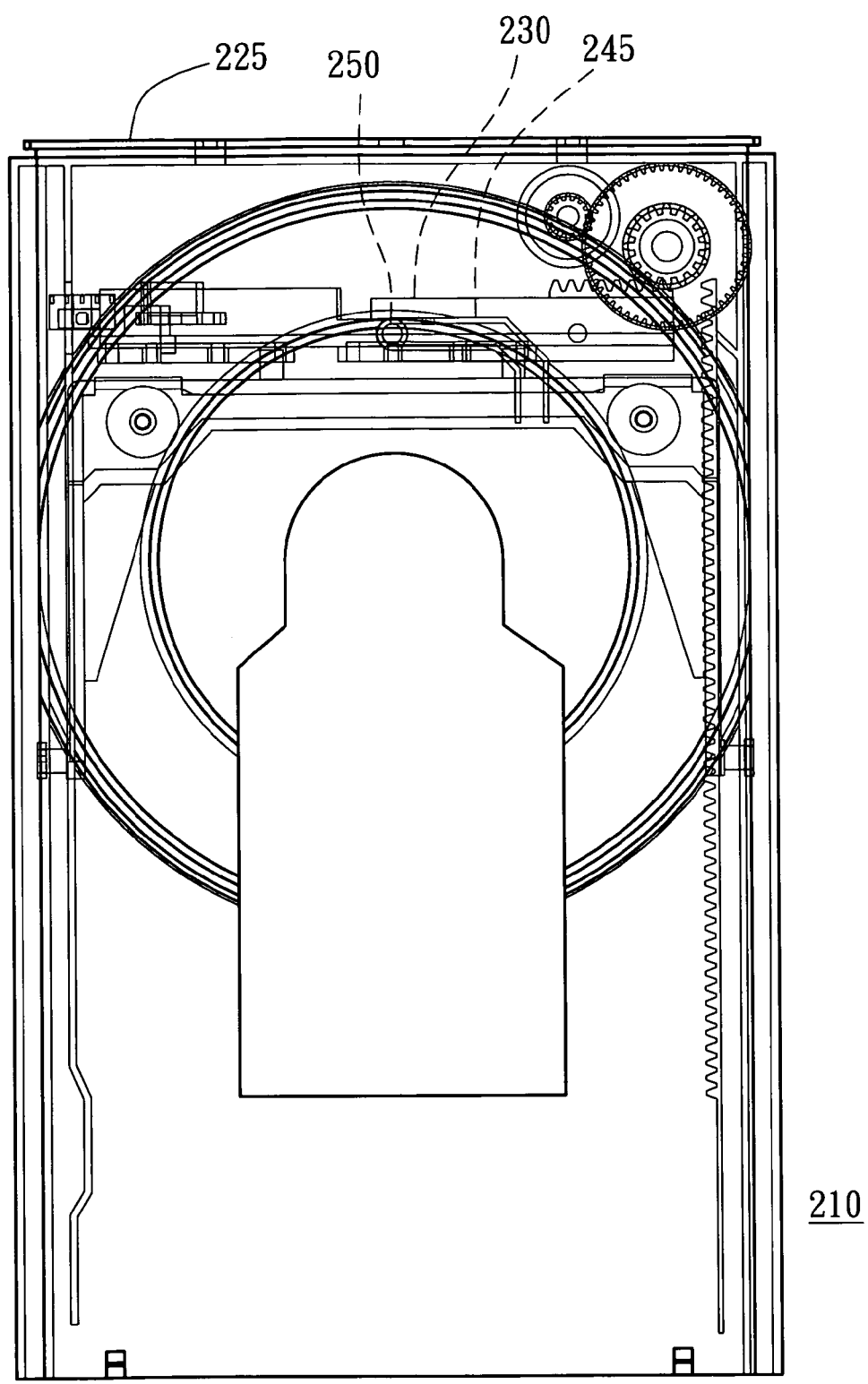
FIG. 3 is a top view of a disc accessing body illustrated in FIG. 2.

Referring to FIG. 3, a top view of a disc accessing body illustrated in FIG. 2 to have a detailed elaboration of the emergent disc-ejection device according to the invention. In FIG. 3, the tray 225 for carrying a disc is illustrated in solid lines, while the active element 230 disposed under and coupled to the tray 225 and adjacent to the bottom casing 205 of the disc player (FIG. 2) is illustrated in dotted lines.

The tray 225, which is adjacent to one side of the active element 230, has a guiding channel 245. The active element 230 has a protrusion 250 capable of sliding in the guiding channel 245.

Refer to FIG. 2 again. The connecting rod 240 is connected with the disc accessing body 210 via a pin joint, so the connecting rod 240 can rotate with regard to the pin joint 253. The connecting rod 240 has force receiving portion 255 corresponding to the via hole 215 and a force applying portion 260 corresponding to the active element 230 and adjacent to the active element 230.

Refer to both FIG. 2 and FIG. 3. When the emergent disc-ejection device according to the invention is used to eject the tray 225 from the disc accessing body 210, or when the user would like to eject the tray 225 when the power source of the disc player is switched off, the user can insert the probe 220 through the via hole 215 of the bottom casing 205 along the first direction X3 co-directional with the axial direction of the probe 220 in FIG. 2.

Figure 4:
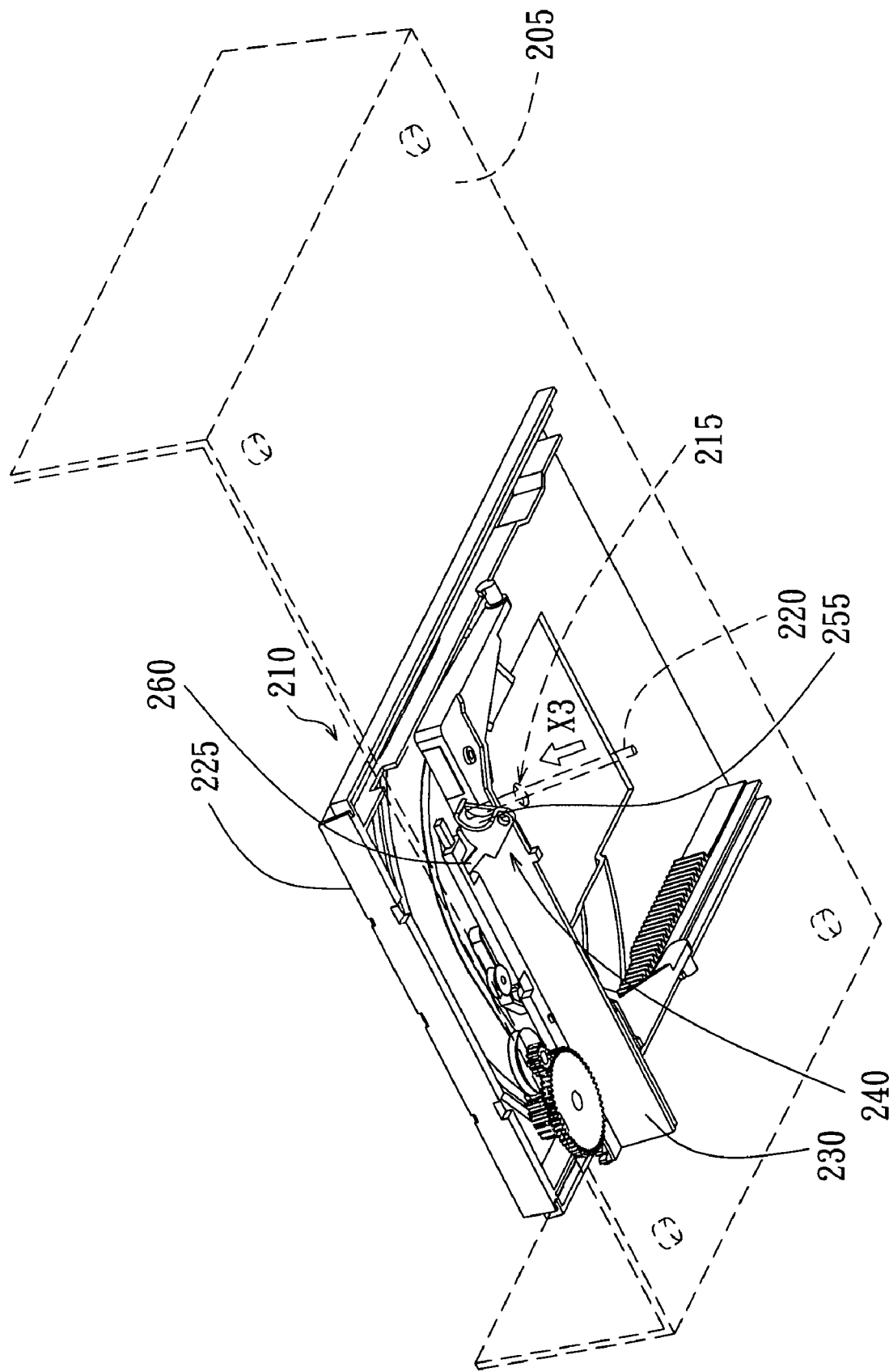
FIG. 4 is a schematic diagram of applying force for the probe will push the active element along a first direction.
Figure 5:
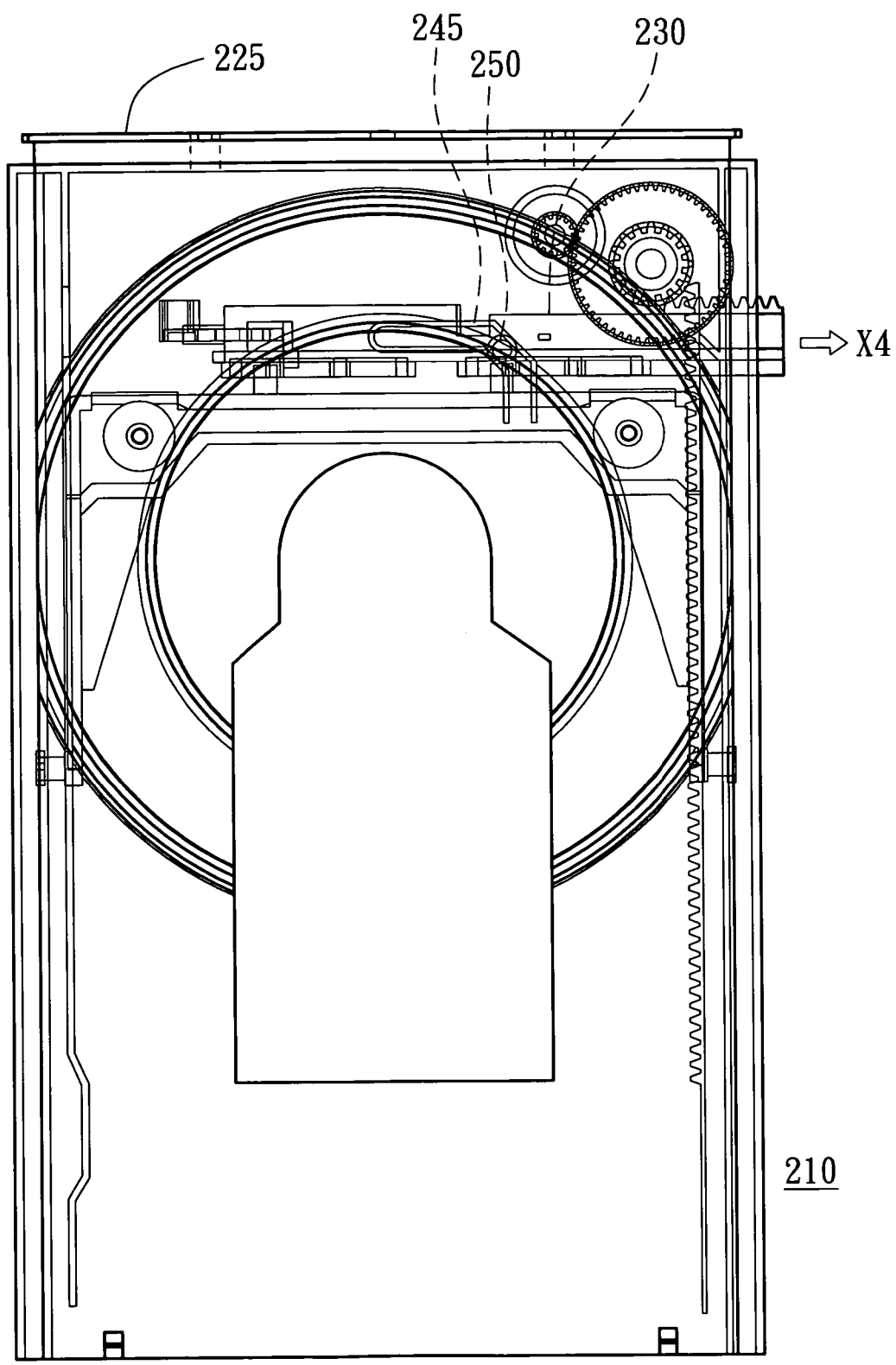
FIG. 5 is a top view of the disc accessing body illustrated in FIG. 4.

Refer to FIG. 4 and FIG. 5 together. FIG. 4 is a schematic diagram of applying force for the probe will push the active element along a first direction, while FIG. 5 is a top view of the disc accessing body illustrated in FIG. 4. For the purpose of illustration in FIG. 4, both the bottom casing 205 and the probe 220 are illustrated in dotted lines, while the disc accessing body 210 disposed on the inner surface of the bottom casing 205 is illustrated in solid lines. Following the operation of emergent disc-ejection device according to FIG. 2 and FIG. 3 of the invention, insert the probe 220 along the first direction X3 in FIG. 2 and have the probe 220 to provide an applying force to the force receiving portion 255 of the connecting rod 240 along the first direction X3. By doing so, the force applying portion 260 of the connecting rod 240 will push the active element 230 to carry the tray 225 to be ejected from the disc accessing body 210 along a second direction X4 substantially perpendicular to the first direction X3.

That is, as shown in FIG. 5, when moving towards the second direction X4 along with the active element 230, the protrusion 250 can carry the guiding channel 245 to eject the tray 225 from the disc accessing body 210. Meanwhile, the user can pull out the ejected tray 225 and remove the disc within.

Figure 1A:
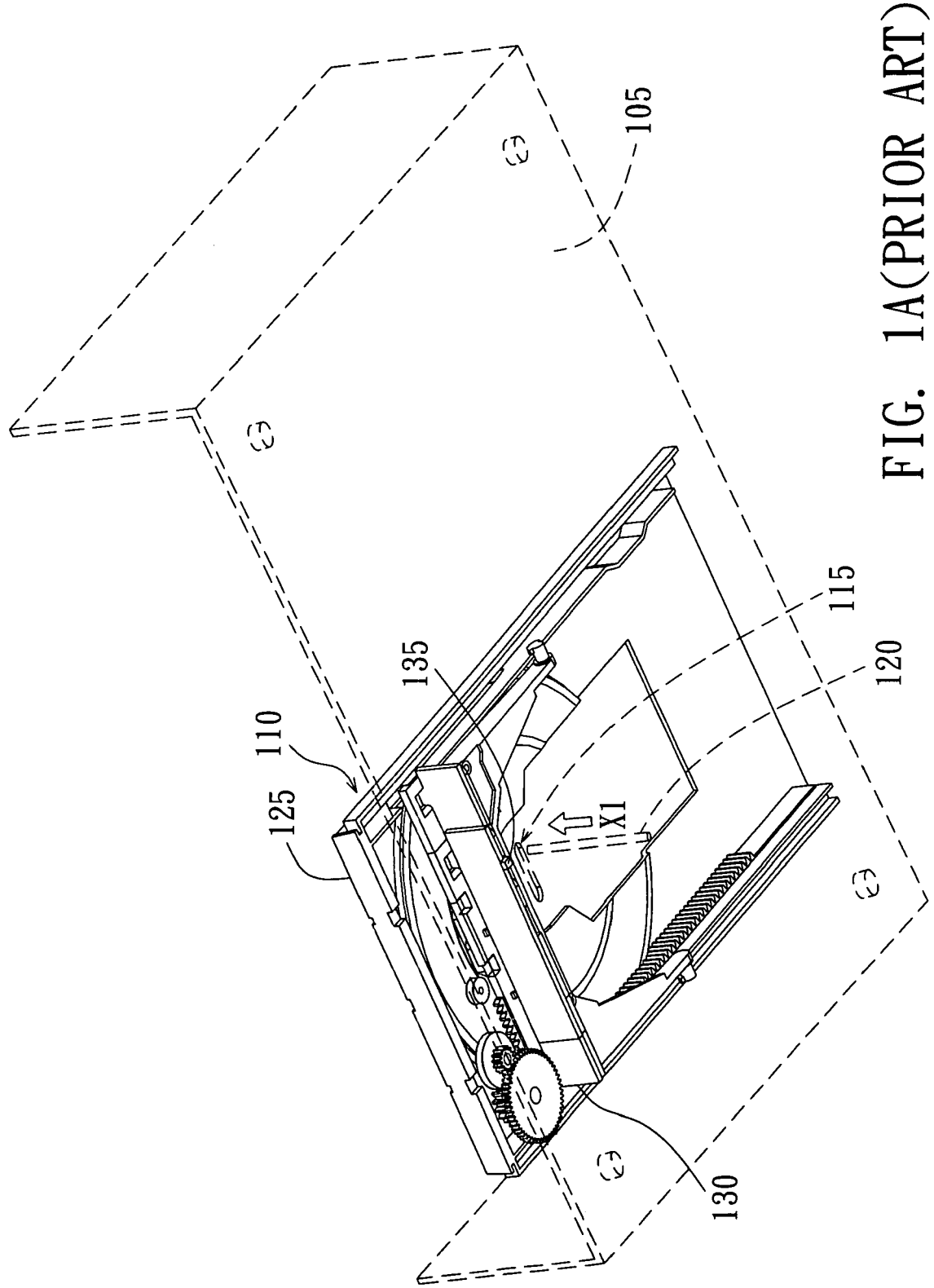
FIG. 1A is a schematic diagram of a disc player with a conventional emergent disc-ejection device.
Figure 1B:
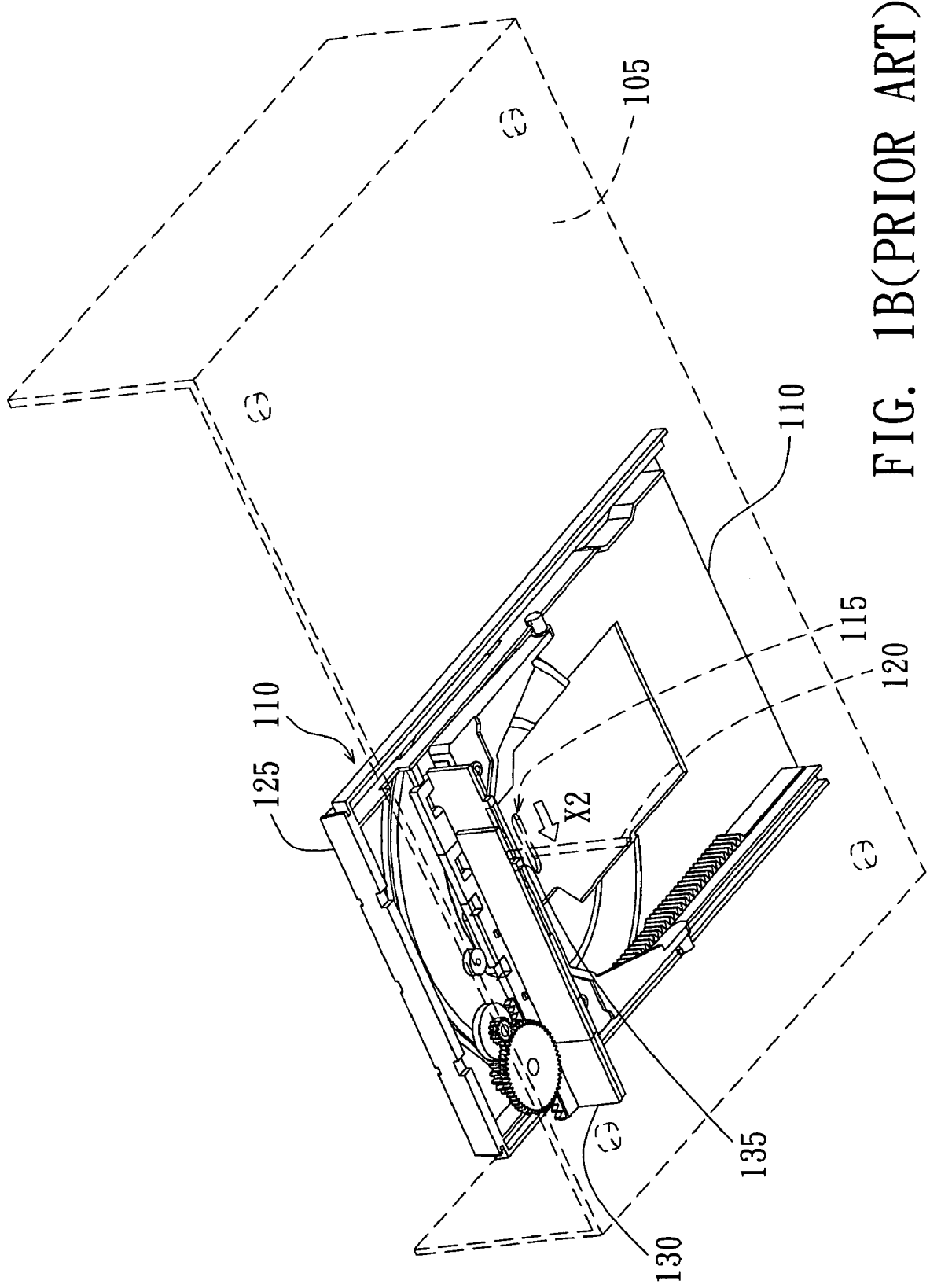
FIG. 1B is a schematic diagram of applying force for a probe will push active element along a second direction.
Figure 1C:
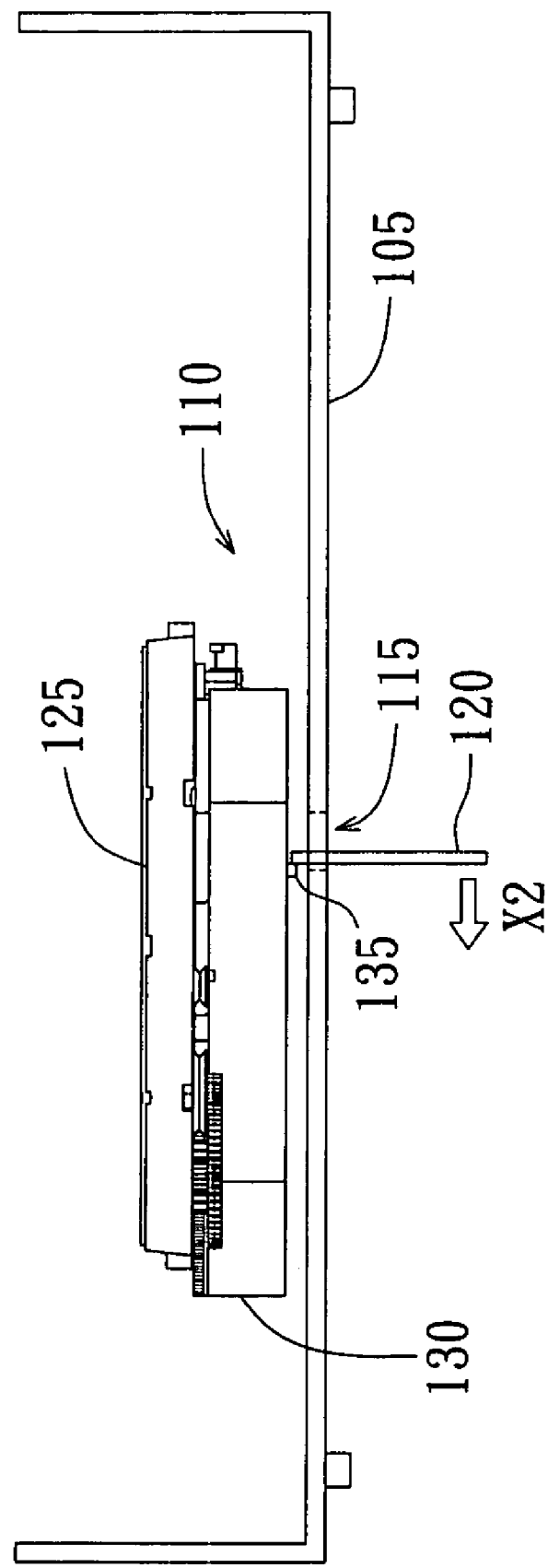
FIG. 1C is a front view of FIG. 1B.

It can be seen from the above preferred embodiment, when using the emergent disc-ejection device according to the invention, the user only needs to perform one movement of inserting the probe 220 into the via hole 215 along the first direction X3 to eject the tray 225 from the disc accessing body 210. While in a conventional emergent disc-ejection device, apart from inserting the probe 120 (FIG. 1A) into the strip via hole 115 along the first direction X1, the user still has to apply a force along the second direction X2 so as to eject the tray 125 from the disc accessing body 110 (FIG. 2). So, the emergent disc-ejection device the invention has the advantage of easy operation which complies with consumers' requirements of a simple and easy operation.

While the invention has been described by way of example and in terms of a preferred embodiment, it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. An emergency ejecting device applied in a disc player having a bottom casing and a disc accessing body, wherein the bottom casing has a via hole, the disc accessing body is disposed on the bottom casing, the emergency ejecting device comprising:

a tray disposed in the disc accessing body for carrying a disc to enter and leave the disc accessing body;

an active element coupled with the tray for carrying the tray to be ejected from the disc accessing body; and a connecting rod, which is connected with the disc accessing body via a pin joint, and has a force receiving portion corresponding to the via hole and a force applying portion corresponding to the active element;

wherein, by inserting a probe into the via hole through the bottom casing along a first direction to provide an applying force to the force receiving portion, the force applying portion will push the active element along a second direction, enabling the active element to carry the tray to be ejected from the disc accessing body.

2. The emergency ejecting device according to claim 1, wherein the tray has a guiding channel, the active element has a protrusion capable of sliding in the guiding channel, when moving towards the second direction along with the active element, the protrusion can carry the guiding channel to eject the tray from the disc accessing body.

3. The emergency ejecting device according to claim 1, wherein the first direction and the axial direction of the probe are co-directional.

4. The emergency ejecting device according to claim 1, wherein the first direction and the second direction are substantially perpendicular to each other.

5. The emergency ejecting device according to claim 1, wherein the disc player is a digital versatile disc (DVD) player.

6. A disc player for accessing a disc, wherein the disc player at least comprises: a bottom casing having a via hole; a disc accessing body disposed the bottom casing, wherein the disc accessing body comprises:
   a tray disposed in the disc accessing body;
   an active element coupled to the tray; and
   a connecting rod, which is connected to the disc accessing body via a pin joint, and has a force receiving portion corresponding to the via hole and a force applying portion corresponding to the active element;
   wherein, by inserting a probe into the via hole through the bottom casing along a first direction to provide an applying force to the force receiving portion, the force applying portion will push the active element along a second direction, enabling the active element to carry the tray to be ejected from the disc accessing body.

7. The disc player according to claim 6, wherein the tray has a guiding channel, the active element has a protrusion capable of sliding in the guiding channel, when moving towards the second direction along with the active element, the protrusion can carry the guiding channel to eject the tray from the disc accessing body.

8. The disc player according to claim 6, wherein the first direction and the axial direction of the probe are co-directional.

9. The disc player according to claim 6, wherein the first direction and the second direction are substantially perpendicular to each other.

10. The disc player according to claim 6, wherein the disc player is a DVD player.

* * * * *